United States Patent [19]
Kress

[11] 4,011,025
[45] Mar. 8, 1977

[54] EXPANDING REAMER
[75] Inventor: Dieter Kress, Aalen, Germany
[73] Assignee: MAPAL Dr. Kress KG, Aalen, Germany
[22] Filed: June 10, 1975
[21] Appl. No.: 585,464
[30] Foreign Application Priority Data
July 16, 1974 Germany .................. 2434041
[52] U.S. Cl. ................ 408/153; 408/179; 408/181; 408/185
[51] Int. Cl.² .................... B23B 29/02
[58] Field of Search ...... 408/146, 147, 153, 158, 408/179, 185, 197, 229, 232, 233, 713; 144/229, 230; 29/105 R, 105 A; 83/677

[56] References Cited
UNITED STATES PATENTS

| 1,032,636 | 7/1912 | Watkins | 144/230 |
|---|---|---|---|
| 1,273,752 | 7/1918 | Ebert | 408/179 |
| 3,195,376 | 7/1965 | Bader | 408/146 |
| 3,591,305 | 7/1971 | Aichhorn et al. | 144/229 X |
| 3,880,545 | 4/1975 | Kress | 408/153 |

Primary Examiner—Leonidas Vlachos
Attorney, Agent, or Firm—Hans Berman

[57] ABSTRACT

An expanding machine reamer whose cutter head has an imperforate core portion and three axially elongated rib portions radially projecting from the core portion in circumferentially spaced relationship. The rib portions are each formed with three bores approximately perpendicular to a common axial plane. A first bore receives a clamping screw engaging a clamping shoe which holds a cutting blade against a flank of the rib portion, second and third bores hold wedge-shaped abutment members radially engaging the blade and backing screws by means of which the radial position and the inclination of the cutting edge of the blade may be adjusted.

9 Claims, 3 Drawing Figures

EXPANDING REAMER

This invention relates to reamers, and particularly to an expandable reamer whose cutter head carries a plurality of blades having cutting edges radially projecting from the head and elongated in an axial direction.

Known expanding reamers require relatively complex devices if several blades are to be adjusted individually for their radial positions and for the inclination of their cutting edges relative to the axis of reamer rotation. The cost of building known expanding reamers generally increases steeply with the number of individually adjustable blades to be accomodated on a common head.

It is a primary object of this invention to provide an expandable reamer whose blades can be adjusted individually on the supporting cutting head, yet which can be built at low cost, even when equipped with three or more blades.

With this object and others in view, as will presently become apparent, the invention provides a reamer whose cutter head is fixedly secured on an axially terminal portion of an elongated shank. The cutter head has a core portion and a plurality of rib portions radially projecting from the core portion in cicumferentially spaced relationship. Each rib portion has first and second axially elongated flanks, whereby the first flank of each rib portion and the second flank of a circumferentially adjacent rib portion bound a flute therebetween.

Each rib portion is formed with a plurality of bores elongated transversely to both flanks of the ribs. A cutting blade elongated associated with each rib portion and releasably clamped to the first flank of the associated rib portion in a position in which the elongated cutting edge of the blade projects radially beyond the rib portion. For this purpose, a clamping screw is received in a first one of the bores of the rib portion, and a clamping shoe retained by the screw engages the blade.

An abutment member movable in at least one other bore of each rib portion has a cam face obliquely inclined relative to the direction of elongation of the receiving bore. The cam face radially engages a portion of the blade remote from the cutting edge. A backing screw threadedly movable in the other bore limits movement of the abutment member under radial pressure exerted by the engaged blade.

Other features and many of the attendant advantages of this invention will readily be appreciated as the same becomes better understood from the following detailed description of a preferred embodiment when considered in connection with the appended drawing in which.

Figure 1:
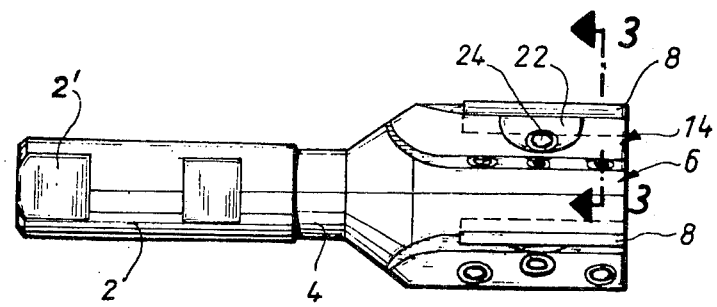
FIG. 1 shows a machine reamer of the invention in side elevation.
Figure 2:
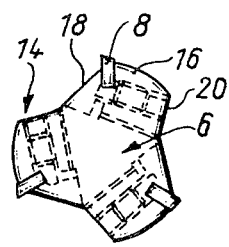
FIG. 2 illustrates the reamer of FIG. 1 in front elevation.
Figure 3:
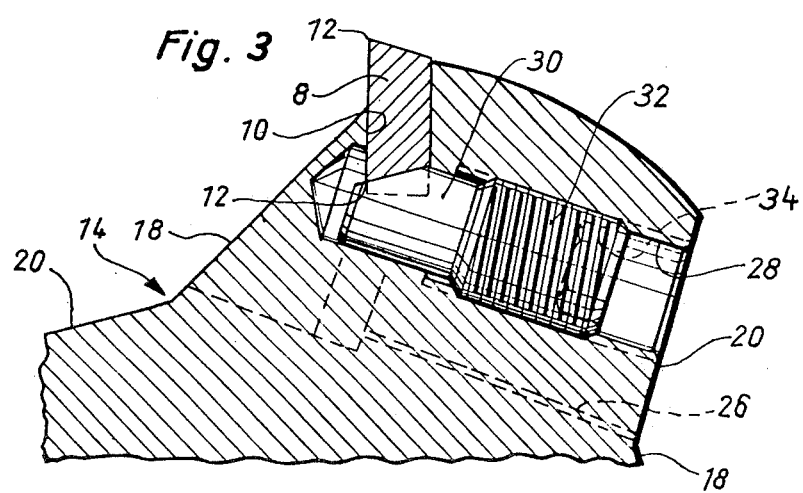
FIG. 3 is a fragmentary, sectional view of the reamer taken on the line 3—3 in FIG. 1.

Referring now to the drawing in detail, there is shown a machine reamer including a generally cylindrical shank 2 having flats 2' for convenient mounting in a chuck or socket which rotates the reamer about the longitudinal axis of the shank. A recess or neck 4 integrally connects the shank 2 with an enlarged cutter head 6. The cutter head has an imperforate core portion whose cross section is an equilateral triangle, best seen in FIG. 2. Three integral rib portions 16 project radially outward from the core portion in equiangular circumferential relationship.

Each rib portion 16 has a leading flank 18 and a trailing flank 20 which converge in a radially outward direction at an acute angle of about 30°. The leading flank 18 of each rib portion is inclined at a greater angle relative to a corresponding radius of the cutter head 6 than the trailing flank 20, and each leading flank 18 bounds a flute 14 of the cutter head jointly with the second flank 20 of a circumferentially adjacent rib portion 16, the two flanks converging at an obtuse angle of approximately 150° toward the bottom of the flute 14.

An axially elongated groove 10 near the radially outer end of each flank 18 receives a blade 8 having two longitudinal cutting edges 12. The blade portion carrying one edge 12 is received in the groove 10, and the other cutting edge 12 radially projects from the cutter head and is parallel to the reamer axis in the illustrated condition of the device.

The blade 8 is releasably clamped to the associated flank 18 by a clamping shoe 22 recessed in the flank 18 and a clamping screw 24 which threadedly engages the rib portion 16 in a threaded bore 26 approximately perpendicular to a plane through the axis of reamer rotation.

Two bores 28 in each rib portion 16 are axially offset from the bore 26 in opposite axial directions and are both off-set radially outward from the bore 26. The three bores are parallel and approximately perpendicular to a plane which includes the reamer axis. Each bore 28 is partly threaded, and its smoothly cylindrical end portion remote from the orifice of the bore in the flank 20 intersects the groove 10. An abutment member 30 is secured in the end portion of the bore 28 by a set screw 32. The abutment member 30 is a cylinder of a diameter slightly smaller than that of the bore 28. An oblique cam face on one end of the member 30 abuts against the portion of the blade 8 which is received in the groove 10. The abutment member 30 is backed by the screw 32 and thereby prevents movement of the blade 8 in a radial inward direction under reaming stresses. The radial position of the exposed cutting edge 12 can be adjusted by inserting a wrench into a hexagonal recess 34 of each backing screw 32 and turning the two screws through respective equal angles. The inclination of the cutting edge 12 relative to the axis of reamer rotation can be changed by different angular movements of the two screws 32.

The three bores 26 are located in a common radial plane, and two other radial planes respectively are common to the two bores 28 of each rib portion. The bores may therefore be drilled and threaded rapidly in a reamer blank held in a very simple jig. None of the bores passes through the core portion, and their offset relationship in the rib portions 16 further contributes to the rigidity of the reamer and to the precision with which the reamer can be operated.

The described angular relationship of the flanks 18, 20 to each other and to the core portion of the cutting head 6 facilitates access of tools to the bores 26, 18 even if the number of blades and associated rib portions 16 is increased beyond the three specifically illustrated. Angles other than the illustrated angles of 30° and 150° will be chosen to suit the number of rib portions.

The illustrated blades 8 are of the known double-edged type which permits simple reversal of the blades when dull edges are to be replaced by freshly sharpened edges. Such blades are preferred for obvious reasons, but are not themselves part of this invention. Similarly, the orientation of the grooves 10 and the blades 8 may be varied within the necessary condition that the direction of cutting edge elongation have a predominant axial component. If so desired, the cicumferential distribution of the several blades 8 and of the associated rib portions 16 may deviate from the illustrated equiangular arrangement as is known in itself.

Other variations of the illustrated reamer will readily suggest themselves to those skilled in the art. It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A reamer comprising:
   a. an elongated shank having an axis;
   b. a cutter head fixedly secured on an axially terminal portion of said shank,
      1. said cutter head having a core portion and a plurality of rib portions radially projecting from said core portion in cirumferentially spaced relationship,
      2. each rib portion having a first axially elongated flank and a second, axially elongated flank,
      3. the first flank of each rib portion and the second flank of a circumferentially adjacent rib portion bounding a flute therebetween,
      4. each rib portion being formed with a plurality of bores elongated in a direction transversely intersecting said first and second flanks thereof;
   c. a cutting blade associated with each rib portion and having two spaced edge portions elongated in a common direction, one of said edge portions being formed with a cutting edge;
   d. clamping means releasably clamping the associated blade to the first flank of said rib portion in a position in which said one edge portion is axially elongated and projects radially beyond said rib portion, said clamping means including
      1. a clamping screw received in a first one of said bores, and
      2. a clamping shoe retained by said screw and engaging a face of said blade intermediate said edge portions;
   e. an abutment member movable in at least one other bore of each rib portion and having a cam face obliquely inclined relative to the direction of elongation of said at least one other bore, said cam face radially engaging the other edge portion of said blade remote from said cutting edge; and
   f. a backing screw threadedly movable in said at least one other bore and limiting movement of said abutment member under radial pressure exerted by the engaged blade.

2. A reamer as set forth in claim 1, wherein said cutter head has at least three rib portions.

3. A reamer as set forth in claim 2, wherein said first bores of said at least three rib portions are located in a common radial plane.

4. A reamer as set forth in claim 3, wherein said at least one other bore of each of said at least three rib portions is located in a common radial plane axially offset from the radial plane of said first bores.

5. A reamer as set forth in claim 2, wherein said core portion is imperforate.

6. A reamer as set forth in claim 5, wherein said first and second flanks of each rib converge at an acute angle in a radially outward direction.

7. A reamer as set forth in claim 6, wherein said first and second flanks bounding said flute therebetween converge at an obtuse angle in a radially inward direction.

8. A reamer as set forth in claim 7, wherein said first bore is offset from said at least one other bore in a radially inward direction.

9. A reamer as set forth in claim 8, wherein said first flank is formed with an axially extending groove, said portion of said blade being received in said groove.

* * * * *